Sept. 11, 1951 F. W. YOUNG 2,567,266
FILTER
Filed June 4, 1947 2 Sheets-Sheet 1
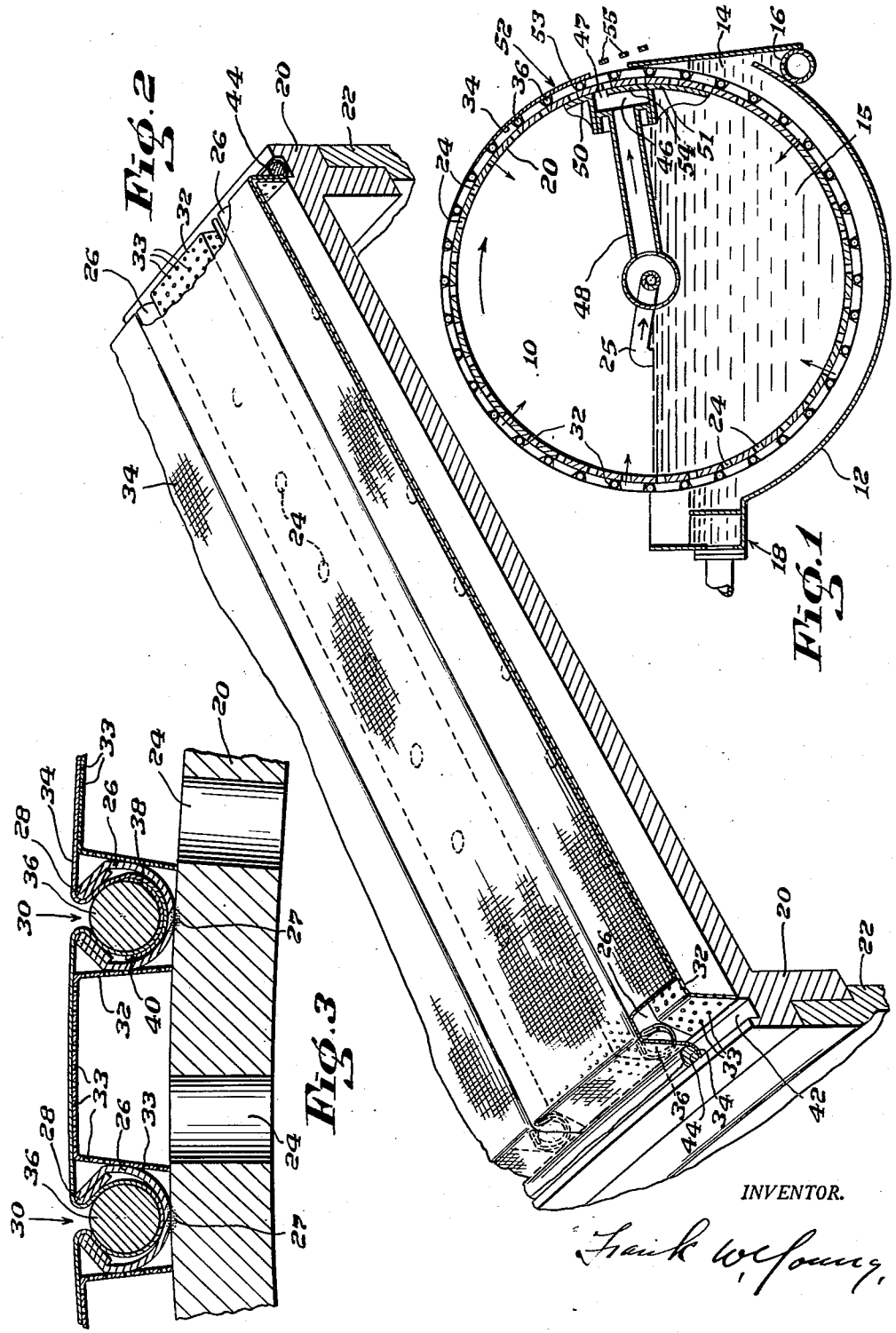
INVENTOR.
Frank W. Young Sept. 11, 1951     F. W. YOUNG     2,567,266
FILTER Filed June 4, 1947     2 Sheets-Sheet 2

INVENTOR.
Frank W. Young,

Patented Sept. 11, 1951

2,567,266

UNITED STATES PATENT OFFICE 2,567,266

FILTER

Frank W. Young, Medfield, Mass.

Application June 4, 1947, Serial No. 752,468

6 Claims. (Cl. 210—199)

This invention relates to continuous vacuum filters of the horizontal rotary drum type wherein a compartmentalized filter surface is revolved through a body of liquid containing suspended solids, the drum being subjected to a vacuum whereby to facilitate the formation of a cake of the solids on the filter surface, the cake being discharged from the drum by any suitable means, including usually a blowback or reverse pressure system.

More particularly, the invention is concerned with a continuous vacuum filter having novel filter-fabric supporting and retaining means serving also to divide the filter drum surface into individual filter cells or compartments.

It has been common to cover the surface of a filter drum divided into contiguous compartments or cells with a filter medium or cover including a piece of cloth or wire. Affixation of the filter cloth to the drum exterior has been achieved in a variety of ways, by, for example, the use of a spiral wire winding, or by rope caulking of portions of the cloth in channels formed in the filter compartmental divisions, or by fastening retaining strips in such channels using screws, or by attaching a strip or rod on top of an ungrooved division, or by a combination of spiral winding with any other of the foregoing. To prevent excessive bellying of the filter cloth in the discharge area when subjected to reverse pressure, spiral winding of the filter-fabric has often been thought necessary.

The use of spiral wire binding, or of other securing means presenting relatively small areas of high pressure contact between the retaining members and the filter cloth, substantially reduces the life of the latter by quickly wearing holes at the points of contact. Caulking renders non-productive a considerable area of otherwise available filter surface and has the further disadvantage of being time-consuming in both application and removal. More frequent shutdowns for removing and replacing worn fabric coverings where spiral winding is used result in high maintenance costs and lowered production.

Likewise, the presence on the surface of the filter fabric of a substantial number of turns of wire impedes the perfect and rapid functioning of the filter by physically blocking off a portion of the otherwise useful filter area, causing clogging, and interfering with the filtering process. It is evident that an external spiral wire binding imposed over the surface of the filter fabric will also impair perfect discharge of the filter cake by interference with complete dislodgement of the cake by the discharge means.

An object of the invention, therefore, is the provision in a continuous vacuum drum filter of fabric retaining means whereby the filter cloth may be held snugly about the drum surface and in spaced relation thereto without the use of spiral wire winding.

Another object of the invention is to provide in a continuous filter, filter-fabric retaining and supporting means which will simultaneously serve to divide the cylindrical filter surface into longitudinal contiguous filter compartments sealed one from the other.

Still another object of the invention is to prolong the life of the filter fabric of a continuous vacuum filter by the provision of improved non-wearing fabric retaining means and thereby to reduce the frequency of shutdowns for repair and replacement of the filter media.

A further object is the provision in a drum filter of novel filter-media retaining means which will permit more perfect discharge of the cake from the filter surface.

With these and other objects in view, the invention is featured by the provision in a rotary drum type filter of a plurality of peripherally spaced members providing longitudinal parallel slots with narrowed openings and dividing the filter surface into a number of contiguous cells or compartments running the length of the drum, the fabric filter cover being depressed into and held in the slots or channels by means of removable locking rods or plugs.

Referring to the accompanying drawings, in which like numerals refer to like parts in the several views, Fig. 1 is a transverse section on a diameter of the continuous drum vacuum filter;

Fig. 2 is an enlarged view partly in perspective of a portion of the drum surface, showing the fabric covering in place;

Fig. 3 is an enlarged section of a portion of the drum showing in detail the novel fabric locking means;

Figure 4:
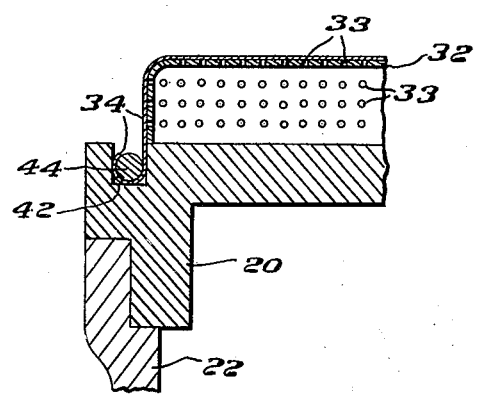
Fig. 4 is a fragmentary sectional view of an end of the drum illustrating the manner of retaining the sides of the filter cloth by caulking.

The filter drum 10 is rotatably mounted with its longitudinal axis disposed horizontally and its lower portion immersed in a tank or vat 12. The mounting and driving means, known and conventional in the art, form no part of the present invention and consequently are not shown in the drawings.

The vat 12 contains solids suspended in a liquid vehicle forming a mixture 14 from which it is desired to extract them by filtration. The level of the mixture 14 in the vat is controlled by any suitable system of inlet piping 16 and outlet valves and dams, shown at 18.

The filter drum 10 is of usual structure and includes a cylindrical supporting metal body portion 20 mounted at each end of drum closures 22 and having spaced about its entire periphery a series of ports 24 communicating with its interior. By pumping means and associated piping 25 the pressure inside drum 10 is maintained below that on the exterior, and by the pressure differential thus caused, the liquid vehicle of the mixture 14 is forced through the hereinafter described filter media and the ports 24 (as shown by arrows) into the drum 10 from which as filtrate 15 it is removed through pipe 25, as shown by an arrow in Fig. 1.

The pipe 25 may be disposed to maintain the filtrate 15 at any desired level within the drum for optimum results, as will hereinafter more fully appear.

As shown in Figs. 1 through 4, spaced about the entire outer surface of the drum are parallel longitudinally disposed slotted metallic tubes 26 welded at 27 to the base 20 and dividing the surface thereof into filter cells or compartments each served by several of the ports 24. The cylindrical tubes 26 open outwardly to form grooves provided with smooth non-fraying edges 28 at either side of their narrowed mouths 30 by folding the slot edges back upon themselves. Between the tubular compartmental divisions 26 are held in place drainage bridges 32, having perforations 33 through.

The filter fabric of wire or cloth 34 is held in place about the drum 10 by tucking portions into the grooves or slots provided by the tubes 26 and inserting from the slot ends removable retaining rods 36 to overlie such portions, thereby sealing the filter compartments one from the other.

For example, in order to lock the cloth 34 in filtering position, the removable bridges 32 are first slid endwise into place between the tubes 26. A portion of the cloth near one end 40 thereof is then pressed down by means of a narrow smooth tool into an open throat of groove 30 in a tube 26, and rod 36 is inserted over such tucked portion to anchor it in position. The cloth is then stretched over an intervening bridge 32 to the next tubular division 26, where the locking is repeated. The procedure is continued until the entire cylindrical surface of the drum is covered with the snugly fitting filter cloth. It will be noted that the cloth will be automatically tensioned by the insertion of the retaining rods 36, since, by the use of a narrow flat tool, a fold insufficient to accommodate the round rod is first depressed into the slot in the tucking operation. The subsequent insertion of the cylindrical rod pulls more fabric into the slot, thereby tensioning the cloth. Subsequently, slack, if any, may be taken up, one compartment at a time, by tensioning the cloth successively all the way around the drum. The loose end is then locked in a slot 30 by first removing one of the rods 36 and tucking an end 38 on top of the end 40 and reinserting the rod. Where the cloth is too long, as will often happen, the end 38 may be locked in place and any excess fabric protruding from the slot thereafter trimmed back evenly.

To provide a seal at both ends of the drum 10, circumferential grooves or troughs 42 are cut in the edges of the steel body portions 20. As shown most clearly in Fig. 4, the sides of filter fabric 34 are drawn down over the ends of the bridges 32 and depressed into the grooves 42. Hard sash cord 44, which swells when wet to lock more tightly, is pounded into the troughs 42 over the fabric as caulking, to retain the cloth firmly in position.

Discharge of the cake is accomplished by a blow-back system disposed within the drum, including a chamber 46 and associated pipe 48. Portions 50 and 51, forming closures for the chamber 46, are arranged for a liquid seal fit with the interior surface of the drum 10. The cake 53 deposited on the filter surface is subjected to a pressure differential, as shown by the arrows, tending to press it against the drum until, as the drum revolves, it reaches the area designated at 52. Here portion 50 serves as a baffle to isolate the cake from further effect of the partial vacuum within the drum. Further rotation of the drum moves the cake to a point opposite the opening 47 of chamber 46, to which is supplied air under greater than atmospheric pressure through piping 48. This air, as shown by the arrow, is forced successively through ports 24 and perforations 33, and also through the filter cloth 34, effectively dislodging the cake 53 and permitting it to drop free from the drum as loose pieces 55, or, depending on the nature of the cake, as a continuous sheet.

Within the chamber 46 an upward extension 54 of the baffle 51 restricts the opening 47 to approximately the width of a port 24, making more effective the blow-back by the increased air velocity thus caused.

Leakage of air from chamber 46 around the baffles 50 and 51 is minimized by a liquid seal as now described. Filtrate tends to flow downwardly both by gravity and rotation of the drum under the upper baffle 50, but this tendency is counterbalanced by the existing air pressure differential. Likewise the tendency of air to escape past baffle 51 is counteracted by maintaining the level of filtrate 15 above the bottom of the baffle 51 but below baffle 50 by means of exhaust pipe 25, thus also providing a liquid seal in the area of the lower baffle 51.

It will be apparent that this novel construction and arrangement of filter parts enables the filter cloth to be held in close-fitting relationship to the external surface of the filter drum without the use of spiral wire winding or of caulking. The fabric may be pulled as taut as desired to prevent bellying at the discharge area and is readily locked in place by the insertion of the longitudinal rods. In like manner removal and replacement of the cloth is facilitated by the use of the novel locking means.

While there is here disclosed a preferred embodiment, it is apparent that changes and alterations may be made without departing from the spirit and scope of the invention.

I claim:

1. In a filter, filter media comprising, in combination, a supporting base, tubular division strips each affixed along a narrow longitudinal area thereof to said base and dividing the same into contiguous filter compartments each provided with drains, said division strips being slotted to provide outwardly facing grooves with narrowed openings, perforated bridges having depending longitudinal flanges on the sides thereof, said bridges being held by said flanges between and in engagement with said strips and in spaced relation to said base, filter fabric covering said compartments, supported by said bridges and having spaced narrow parallel portions thereof depressed into said grooves, and retaining rods fitting said grooves to overlie and retain said portions to lock said filter fabric in effective filtering position.

2. In a filter, filter media comprising, in combination, a supporting base having spaced ports therein, tubular division strips each affixed along a narrow longitudinal area thereof to said base to divide the same into contiguous filter compartments each drained by at least one of said ports, said strips being slotted to provide outwardly facing grooves with narrowed openings, perforated bridges having depending flanges on the sides thereof, said bridges being adapted to be slid between and to engage said strips and to be held in operative position on said base by the engagement of said flanges with said tubular strips, filter fabric covering said compartments, supported by said bridges and having spaced narrow parallel portions thereof depressed into said grooves, and retaining rods fitting said grooves to overlie and retain said portions to lock said filter fabric in effective filtering position.

3. In a filter, filter media comprising, in combination, a supporting base having spaced ports therein, tubular division strips each affixed along a narrow longitudinal area thereof to said base to divide the same into contiguous filter compartments each drained by at least one of said ports, said strips being slotted to provide outwardly facing grooves with narrowed openings, perforated bridges having depending perforated flanges on the sides and ends thereof, said bridges being adapted to be slid between and to engage said strips and to be held in spaced relation to and in operative position on said base by the engagement of said side flanges with said strips, filter fabric covering said compartments, supported by said bridges and having spaced narrow parallel portions thereof depressed into said grooves, and retaining rods fitting said grooves to overlie and retain said portions to lock said filter fabric in effective filtering position.

4. In a filter, filter media comprising, in combination, a supporting base, tubular division strips each affixed along a narrow longitudinal area thereof to said base and dividing the same into contiguous filter compartments, said compartments being provided with drains, said division strips being slotted to provide outwardly facing grooves with narrowed openings, and perforated bridges fitting said compartments and having depending longitudinally extending flanges on the sides thereof, said bridges being held by said flanges between and in engagement with said strips and in spaced relation to said base, said compartments being adapted to be covered by filter fabric supported by said bridges and held in effective filtering position by having spaced narrow parallel portions thereof depressed in said grooves and retained therein by rods fitting said grooves and overlying said portions.

5. In a filter, filter media comprising, in combination, a supporting base, metallic tubular division strips each welded along a narrow longitudinal area thereof to said base and dividing the latter into contiguous filter compartments sealed one from the other, said compartments being provided with drains, said division strips being slotted to provide outwardly facing grooves with narrowed openings having smooth non-fraying edges, and perforated bridges fitting said compartments and having depending longitudinally extending perforated flanges on the sides thereof, said bridges being supported in spaced relation to said base by the engagement therewith of the edges of said flanges and further being held against outward movement by the locked engagement of the sides of said flanges with said strips, said compartments being adapted to be covered by filter fabric supported by said bridges and held in effective filtering position by having spaced narrow parallel portions thereof depressed in said grooves and retained therein by rods fitting said grooves and overlying said portions.

6. In a filter, filter media comprising, in combination, a supporting base, a series of division strips each having a generally cylindrical outer surface and being affixed along a narrow longitudinal area of said surface to said base so that portions of said surface overhang said base on both sides of said strip, said strips dividing said base into contiguous filter compartments sealed one from the other, said compartments being provided with drains, and perforated bridges fitting said compartments and having depending longitudinally extending perforated flanges on the sides thereof, said bridges being supported on and in spaced relation to said base by said flanges while being held against outward movement by the locked engagement of the sides of said flanges with said overhanging portions of said strips.

FRANK W. YOUNG.

REFERENCES CITED

The following references are of record in the file of this patent:

UNITED STATES PATENTS

| Number | Name | Date |
|---|---|---|
| 1,892,306 | Hillier | Dec. 27, 1932 |
| 2,134,703 | Cobb | Nov. 1, 1938 |
| 2,204,928 | Culver | June 18, 1940 |
| 2,289,411 | Denhard et al. | July 14, 1942 |